(No Model.)

J. W. CALEF.
LAWN RAKE.

No. 388,179. Patented Aug. 21, 1888.

Witnesses.
E. K. Boynton.
Francis E. Stanwood

Inventor.
Joseph W. Calef.
by H. E. Lodge, Atty.

UNITED STATES PATENT OFFICE.

JOSEPH W. CALEF, OF NORTH EASTON, ASSIGNOR OF ONE-HALF TO WILLIAM T. ANDREWS, OF BOSTON, MASSACHUSETTS.

LAWN-RAKE.

SPECIFICATION forming part of Letters Patent No. 388,179, dated August 21, 1888.

Application filed April 14, 1888. Serial No. 270,657. (No model.)

*To all whom it may concern:*

Be it known that I, JOSEPH W. CALEF, a citizen of the United States, residing at North Easton, in the county of Bristol and State of Massachusetts, have invented certain new and useful Improvements in Lawn-Rakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to rakes, particularly lawn-rakes, which are employed in a certain class of work where it is desirable that the teeth of the rake should enter the ground but slightly, if at all.

My invention consists in securing at the ends of the rake two small wheels or rolls, which are so positioned as to prevent the rake-teeth from entering the soil.

Figure 1:
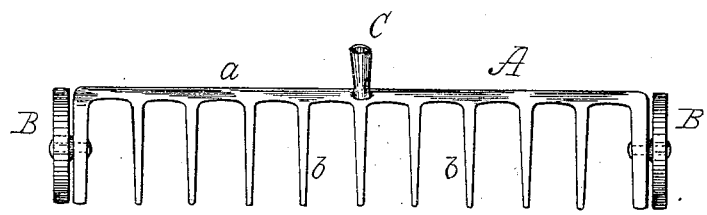
Figure 2:
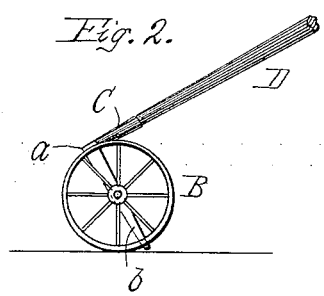
Figure 3:
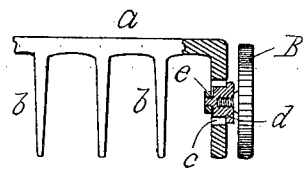
Figure 4:
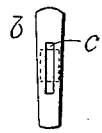

The drawings represent, in Figure 1, a side elevation, and Fig. 2, an end view, of a rake embodying my invention. Fig. 3 is a vertical section longitudinally of the back of the rake, showing only a portion of the latter and the adjustable arrangement of the wheels. Fig. 4 is a view exteriorly of an end tooth.

Figure 6:
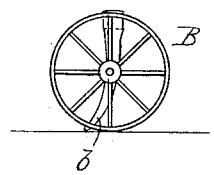

In said drawings, A represents a rake as an entirety, composed of the back $a$ and with a series of downwardly-projecting teeth, $b\ b$, after the construction of rakes in general. If desired, and for certain kinds of work, the teeth may be set more closely together and bent slightly upward at the points. (See Fig. 6.) At the opposite extremities of said rake, and arranged at right angles to the back and preferably exteriorly of the end teeth, are secured two wheels, B B. The arbors on which said wheels revolve may be rigidly fixed in the end teeth, (see Fig. 1,) or they may be adjustable, as hereinafter explained, said wheels in either instance revolving freely.

I find by experiment that when the teeth are at right angles to the ground their extremities should project beyond the lowest point of the wheels, in order that when the rake is positioned for use (see Fig. 2) said teeth shall not be raised too high from the ground, but may be disposed obliquely forward just clear of the surface. By such adjustment the height of the teeth from the surface of the ground is readily controlled by changing the obliquity of the handle, using it more or less upright. By this arrangement it is evident that the entire weight of the tool is removed from the hands of the workman, and when the rake is actively employed it is pushed out as far as is desired, moving upon the wheels, and is then drawn toward the person.

A socket, C, centrally of the back $a$, is adapted to receive the handle D; hence when the latter is grasped by the workman the teeth are obliquely positioned with respect to the ground, and the points of said teeth are directed forward toward the individual and are held just clear of the surface and prevented from engaging in the soil any great distance. Thus the extremities of the teeth are in proper adjustment, and the surface, particularly in lawns, is not needlessly disturbed. Work can be done much more expeditiously, for the reason that the rake may be pushed out any distance, limited by the length of the handle, and then drawn rapidly toward the person using it. Moreover, the effort now required to lift the rake and set it out preparatory to an inward pull is not needed, and the operation is rendered very much more easy and attended with less effort.

In Figs. 3 and 4 I have shown such construction as renders the wheels adjustable vertically in position upon the end teeth. By this means the teeth may be caused to enter the ground slightly, if so desired. To effect this result, I have formed two similar vertically-disposed slots, $c\ c$, in each end tooth. Said slots extend therethrough from side to side, and are adapted to receive a metallic block, $d$, which fits therein, and is capable of vertical adjustment by means of the check-nut $e$. The teeth thus can be made to enter the ground to any desired extent, or not at all, as circumstances or occasion may require.

Figure 5:
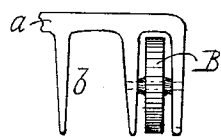

I do not desire to be limited to the precise form of adjustment herein described, as various other simple mechanical expedients are readily suggested; nor is it necessary that the wheels should be placed exteriorly of the end teeth, as it is manifest they may be secured with equally good results between the end tooth and the one next adjacent. (See Fig. 5.)

By this invention and the employment of two end wheels the rake is moved over the ground by roller friction in lieu of sliding friction, and the wear upon the teeth incident to the contact of the teeth of the rake with the ground is avoided. A very light style of wheel may be used, in which event my invention can be applied to hand-rakes of wood, and thereby prevent the breaking of the teeth, which is now of frequent occurrence.

The rake can be made longer to cover more ground, since an increase in the weight is no great objection, provided the weight is on the wheels, while more work can be done at each stroke.

What I desire to claim is—

1. A hand-rake having slotted teeth and wheels provided with bearings which are adjustable in said slot, substantially as set forth.

2. The hand-rake A, composed of the back a, teeth b b, and handle D, combined with the wheels B B, mounted in the adjustable block d, the slots c c, and the fastening-nuts e, substantially as described.

In testimony whereof I affix my signature in presence of two witnesses.

JOSEPH W. CALEF.

Witnesses:
H. E. LODGE,
WM. T. ANDREWS.